Oct. 26, 1965 N. N. GITLIN ETAL 3,213,839
DEVICE FOR MODIFYING SPARK IGNITION IN
CARBURETOR ENGINES INTO TORCH IGNITION
Filed April 5, 1963

INVENTORS
N. N. GITLIN
S. N. LISOVSKY

BY Glascock, Downing & Seebold
ATTORNEYS

United States Patent Office 3,213,839
Patented Oct. 26, 1965

3,213,839
DEVICE FOR MODIFYING SPARK IGNITION IN CARBURETOR ENGINES INTO TORCH IGNITION
Neukh Nakhimovich Gitlin, Tambovskaia 75, Apt. 91, and Semen Nickiforovich Lisovsky, Tambovskaia 75, Apt. 65, both of Leningrad, U.S.S.R.
Filed Apr. 5, 1963, Ser. No. 270,970
3 Claims. (Cl. 123—143)

The present invention relates to improvements in the fuel system of carburetor gasoline engines by providing the same with torch ignition in precombustion chambers. More specifically, it relates to means for converting engines with spark ignition in the main combustion chamber above the piston into engines provided with torch ignition from precombustion chambers connected with the main combustion chambers through aperture means.

As is known, torch ignition increases engine efficiency, reduces the content of carbonic oxide and other noxious components in the exhaust gases, and provides for efficient operation on gasoline of low octane number.

Numerous attempts have been made heretofore to employ precombustion chambers and torch ignition in carburetor engines. However, all attempts have led only to the construction of special-type engines differing from conventional engines in many aspects. The construction of these engines usually involves their production in specialized plants.

The present invention requires no special change in the engine design and permits the conversion of a conventional engine with spark ignition in the main combustion chamber into an engine with torch ignition from a precombustion chamber in local garages and repair shops employing low-cost equipment.

The main object of the present invention is to provide means for permitting the quick and easy modification of spark ignition in carburetor engines into torch ignition and for adapting the engine for operation on low-octane gasoline.

Another object of the invention is to provide means for preparing a low-flash air-vapor mixture from low-octane gasoline on which the engine operates in order to initiate a torch flame in each precombustion chamber to ignite the lean mixture in the main combustion chambers of the cylinders.

Still another object of the invention is to provide means capable of preparing the combustible mixture in a continuous automatic process and of feeding the mixture into the precombustion chambers, with the automation of the process being based on pressure differences in the cylinders.

A further object of the invention is to provide means capable of improving conditions for the low-octane gasoline to volatilize and for the torch flame to flash under temperatures below zero.

All the above objects have been embodied in the assemblage including the following among its main components:

(1) The assemblage is provided with an auxiliary carburetor which serves to prepare and supply the easily inflammable air-gasoline mixture to the precombustion chambers and with means constituting detachable precombustion chambers which are threaded into wells of the cylinder head, instead of spark plugs, with such means including components providing the combustion space having orifices, an automatic valve mechanism for admitting the mixture into the precombustion space, and a spark plug respectively.

(2) The auxiliary carburetor is defined by a reservoir incorporated in the engine fuel line parallel to the carburetor, filled with fuel by the engine fuel pump through a pipe connection provided with an atomizing jet, an air filter, and a pipe connection for discharging the gasoline vapor and air mixture.

(3) The reservoir includes a float and needle valve associated therewith for passing the surplus fuel as soon as the float rises above the normal level through a duct and a pipe connection and a non-return valve prevents the fuel from entering the reservoir through the duct.

(4) The assemblage is provided with an automatic valve mechanism which periodically feeds the air-gasoline mixture from the auxiliary carburetor to the precombustion chamber, with such automatic mechanism having a valve in the pipe line leading from the auxiliary carburetor to the detachable precombustion chamber.

The valve opens the port during the admission stroke due to its own weight and to the rarefaction created in the cylinder thus admitting the mixture into the precombustion chamber and air into the auxiliary carburetor through the air filter. At the beginning of the compression stroke, the valve closes and the lean mixture admitted to the cylinder mixes with the easily-inflammable mixture supplied by the auxiliary carburetor.

The above advantages and features of the present invention will become apparent upon reading the following detailed description taken in conjunction with the claims and accompanying drawings, in which:

Figure 1:
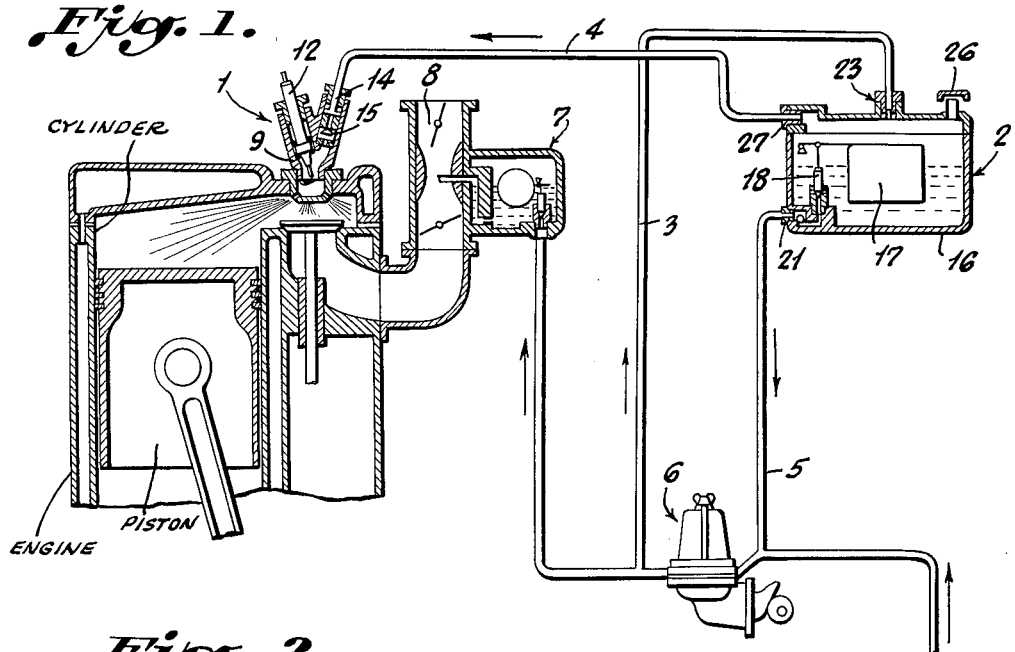
FIG. 1 is a side elevational view of the assemblage arranged on an engine.

The means for converting conventional spark ignition engines into the torch ignition engines as shown in FIG. 1, includes detachable precombustion chambers indicated generally 1 which are threaded into the bores of the head instead of conventional spark plugs, and an auxiliary carburetor 2 serving for mixing air and the low-octane gasoline forced by the pump 6 through fuel pipe line 3, pipe line 4 for feeding the mixture from the auxiliary carburetor to the detachable combustion chambers 1 and pipe line 5 for draining the auxiliary carburetor of the fuel.

All other units of the engine fuel system including fuel pump 6, carburetor 7, and throttle valve 8 shown in FIG. 1, require no modification and are of conventional types.

The purpose of the precombustion chamber 1 is to create a torch of flame for igniting the lean mixture in the engine cylinder.

Figure 2:
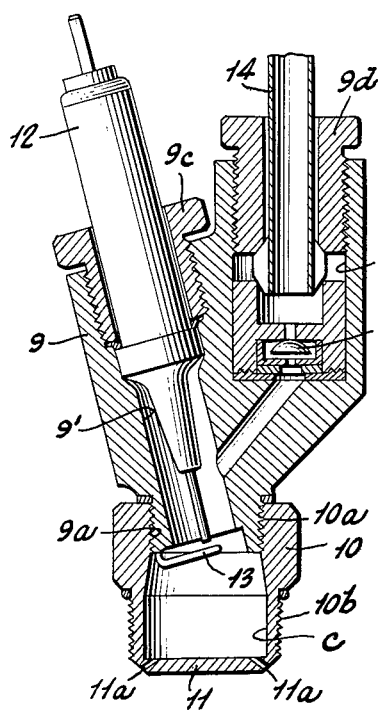
FIG. 2 is a view in vertical section and partly in elevation of the means constituting the detachable precombustion chamber.

As best illustrated in FIG. 2, each precombustion chamber includes a body 9 which is externally threaded at 9a for coacting with internal threads 10a of a cap 10. The cap 10 is externally threaded at 10b so that the body 9 can be threaded into the well of the cylinder head in lieu of a conventional spark plug. The interior of the cap 10 defines a precombustion space C and end wall 11 thereof is provided with orifices 11a.

The body 9 is provided with a bore 9' for receiving a spark plug 12 having electrodes 13 and the plug is held in position by a threaded cap 9c. In addition, the body 9 is formed with a second bore 9" which receives a pipe connection 14 which leads to and is in communication with the line 4 for introducing the mixture into the precombustion space C. An automatic mechanism embodying a semispherical valve serves for periodically introducing the mixture into the space. A threaded cap 9d holds the connection 14 and automatic mechanism in proper position.

The various threaded connections are provided with suitable sealing components.

Figure 3:
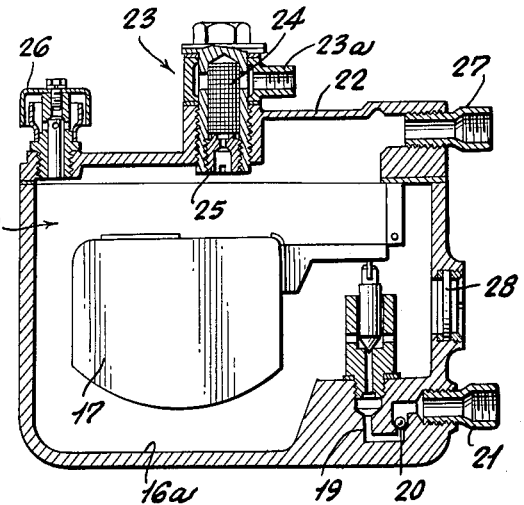
FIG. 3 is a view in vertical section and partly in elevation of the auxiliary carburetor.

From FIG. 3, it will be seen that the auxiliary carburetor 2 is intended for collecting light fraction gasoline components, mixing the vapors with the aspirated dust-clean air, and feeding the resulting mixture to precombustion chambers through the pipe line 4.

The auxiliary carburetor 2 consists of a casing 16 providing a reservoir 16a for the low-octane gasoline, and a float 17 is pivotally mounted within the casing. The float is operably connected to a needle valve 18 which maintains a constant level of gasoline in the reservoir by passing excessive amounts of gasoline through a duct 19 in which is located a non-return ball valve 20 and through pipe connection 21 to which pipe line 5 is attached. As soon as the gasoline level in reservoir 16a rises above normal, the float 17 rises and lifts the needle valve 18 from its seat thereby connecting the reservoir through the duct 19, pipe connection 21 and pipe line 5 with the engine fuel tank.

The open end of the casing 16 is closed by a cover 22. A fitting 23 is provided with a pipe connection 23a adapted to be attached with the fuel pipe line 3 as disclosed in FIG. 1, and is conveniently mounted on the cover. The fitting 23 also includes a fuel filter 24 and an atomizing jet 25.

The cover 22 carries an air filter 26 and a pipe connection 27 to which the pipe line 4 is secured. Manifestly, the mixture formed of vapors of light gasoline fractions and air cleaned by the filter 26 leave the reservoir 16a via connection 27 for passage through the line 4 to the precombustion chambers 1.

One of the walls of the casing 16 is provided with an inspection opening 28 so that the interior thereof may be observed.

The engine modified by the present invention functions as follows:

With the engine operating, the fuel pump 6 forces gasoline into the carburetor 7 and then through the pipe line 3, pipe connection 23, fuel filter 24 and the jet 25 supplies the carburized gasoline into the reservoir 16a of the auxiliary carburetor 2.

The spray of gasoline atomized by the jet 25 is directed against the float 17 and reservoir walls. The gasoline is atomized still more finely, dissociated into fractions, and, by spreading over the float towards the reservoir walls, is evaporated intensively. The vapors accumulate under the cover 22.

Forced in by the rarefaction in the cylinder, the combustible gasoline mixture enters the cylinders during the admission stroke as is customary in the conventional-type engines. However, the air to fuel ratio in the mixture reaches 1.2–1.6 at partial loads and 0.9 with the engine operating at full power.

Simultaneously, during the admission stroke, the valve 15 opens by reason of its own weight and to the rarefaction in the cylinder, and thus creates a vacuum inside the auxiliary carburetor 2 through pipe connection 14, pipe line 4 and pipe connection 27.

This will draw in the outside air through filter 26 which will mix with the light fraction vapors filling the space under the cover 22. The resultant air-gasoline mixture will have an excess air to fuel ratio of 0.15–0.25 and the mixture will then enter the precombustion chamber through connection 27, line 4, connection 14 and open valve 15.

At the beginning of the compression stroke, valve 15 returns to its seat. Immediately precombustion space C, filled with the easily inflammable mixture from the auxiliary carburetor 2, receives the lean mixture forced from the engine cylinder through the orifices 11a. By the moment of sparking, precombustion space C will contain a mixture which is richer than that in the cylinder and which is easy to ignite.

As soon as the mixture is ignited by the spark effected between the electrodes 13, the torch flame enters the main combustion chamber above the piston and ignites the lean mixture in the cylinder.

Though the present invention is described in accordance with the embodiment which has been found most desirable, various modifications may be made without departing from the spirit and scope of the invention as defined by the appended claims.

The invention claimed herein has proved efficient in automobiles re-equipped for the torch ignition of the mixture during the tests undertaken by the Central Research Institute and Automobile, Tractor and Stationary Engine Fuel System Equipment Design Institute (USSR).

What we claim is:

1. The combination with an internal combustion engine having a head, cylinders in the head, a fuel pump, a carburetor, a fuel source, and conduit means leading from the fuel source to the fuel pump and carburetor, of an assemblage for modifying spark ignition into torch ignition for such engine, said assemblage including an auxiliary carburetor, additional conduit means operably connected with the fuel pump and the auxiliary carburetor for supplying the auxiliary carburetor with fuel, the head having a well above each cylinder and in communication therewith, means constituting a precombustion chamber adapted to be detachably mounted in each well, each precombustion chamber comprising a body, means providing a precombustion space in the body and orifices therein for establishing communication between the precombustion space and the cylinder, a spark plug directly positioned in the precombustion space, further conduit means between the auxiliary carburetor and each precombustion chamber for supplying a mixture of light fuel fractions and air from such carburetor to each chamber, and automatically operable valve means in the body for controlling the supply of such mixture through said further conduit means to the precombustion space with such valve means opening during the admission stroke for creating a vacuum within the auxiliary carburetor to draw air into such carburetor for mixing with the fuel supplied to the auxiliary carburetor by the fuel pump while the valve closes at the beginning of the compression stroke so that the precombustion space filled with the mixture from the auxiliary carburetor receives the mixture from the associated cylinder via the orifices and when the mixture in the precombustion space is ignited by the activation of the spark plug, the torch flame enters the cylinder and ignites the mixture therein.

2. The combination with an internal combustion engine having a head, cylinders in the head, a fuel pump, a carburetor, a fuel source, and conduit means leading from the fuel source to the fuel pump and carburetor, of an assemblage for modifying spark ignition into torch ignition for such engine, said assemblage including an auxiliary carburetor operably connected with said fuel pump for receiving fuel from the fuel source, means constituting a precombustion chamber detachably mounted in said head above each cylinder and in communication with the cylinder, each precombustion chabmber comprising a body, means providing a precombustion space in the body and orifices therein for establishing communication between the precombustion space and the cylinder, igniting means directly positioned in the precombustion space, means between the auxiliary carburetor and each precombustion chamber for supplying a mixture of light fuel fractions and air from the auxiliary carburetor to each chamber, and automatically operable valve means in the body for controlling the supply of such mixture from the auxiliary carburetor to the precombustion space with such valve means opening during the admission stroke for creating a vacuum within the auxiliary carburetor to draw air into such carburetor for mixing with the fuel supplied thereto by the fuel pump while at the beginning of the compression stroke the valve closes whereby the precombustion space filled with the mixture from the auxiliary carburetor receives the mixture from the associated cylinder via the orifices so that when the mixture in the precombustion space is ignited by the activation of the igniting means, the torch flame enters the cylinder and ignites the mixture therein.

3. The combination with an internal combustion engine having a head, cylinders in the head, a fuel pump, a carburetor, a fuel source, and conduit means leading from the fuel source to the fuel pump and carburetor, of an assemblage for modifying spark ignition into torch ignition for such engine, said assemblage including an auxiliary carburetor, additional conduit means operably connected with the fuel pump and the auxiliary carburetor for supplying the auxiliary carburetor with fuel, the head having a well above each cylinder and in communication therewith, means constituting a precombustion chamber detachably secured in each well, each precombustion chamber comprising a body, means providing a precombustion space in the body and orifices therein for establishing communication between the precombustion space and the cylinder, a spark plug directly positioned in the precombustion space, further conduit means between the auxiliary carburetor and each precombustion chamber for supplying a mixture of light fuel fractions and air from such carburetor to each chamber, said auxiliary carburetor including an air filter, a fuel filter, an atomizing jet for the fuel, a float, a needle valve operably connected with the float, a line leading from the auxiliary carburetor to the fuel source, duct means between the needle valve and said line, a non-return valve in the duct means for preventing a back flow of the fuel, the arrangement being such that when the float rises above a predetermined level, the needle valve opens and passes excessive amounts of fuel into the duct means past the non-return valve and into the line to the fuel source, and automatically operable valve means in the body for controlling the supply of the mixture from the auxiliary carburetor through said further conduit means to the precombustion space with such valve means opening during the admission stroke for creating a vacuum within the auxiliary carburetor to draw air through the air filter for mixing with the fuel supplied through the fuel filter and jet by the fuel pump while the valve closes at the beginning of the compression stroke so that the precombustion space filled with the mixture from the auxiliary carburetor receives the mixture from the associated cylinder via the orifices and when the mixture in the precombustion space is ignited by the activation of the spark plug, the torch flame enters the cylinder and ignites the mixture therein.

References Cited by the Examiner
UNITED STATES PATENTS

| 2,016,952 | 10/35 | Arato | 123—122 |
| 2,075,911 | 4/37 | Roth | 123—32 |
| 2,884,913 | 5/59 | Heintz | 123—32 |
| 3,001,519 | 9/61 | Dietrich et al. | 123—136 |

FOREIGN PATENTS

| 573,840 | 3/24 | France. |
| 915,320 | 7/46 | France. |
| 966,733 | 3/50 | France. |
| 976,273 | 10/50 | France. |

RICHARD B. WILKINSON, *Primary Examiner.*